United States Patent
Montgomery, Jr. et al.

(10) Patent No.: US 7,245,111 B2
(45) Date of Patent: Jul. 17, 2007

(54) REGULATOR SYSTEM FOR ALTERNATOR

(75) Inventors: William G Montgomery, Jr., Stanwood, WA (US); Michael D. Eddy, Ocoee, FL (US); Gary E. Morrissette, Groveland, FL (US)

(73) Assignee: Ballard Commercial Industries Inc., Arlington, WA (US)

( * ) Notice: Subject to any disclaimer, the term of this patent is extended or adjusted under 35 U.S.C. 154(b) by 70 days.

(21) Appl. No.: 10/991,793

(22) Filed: Nov. 17, 2004

(65) Prior Publication Data

US 2005/0151516 A1   Jul. 14, 2005

Related U.S. Application Data

(60) Provisional application No. 60/520,603, filed on Nov. 17, 2003.

(51) Int. Cl.
*H02H 7/06* (2006.01)
*H02P 9/00* (2006.01)
*H01R 33/00* (2006.01)

(52) U.S. Cl. ............................. 322/45; 322/28; 439/34

(58) Field of Classification Search ................ 322/45, 322/28; 310/68 D, 68 A, 68 R; 320/123; 323/266; 439/34, 504, 503; 307/10.7, 10.3, 307/10.1, 10.6
See application file for complete search history.

(56) References Cited

U.S. PATENT DOCUMENTS

| | | | |
|---|---|---|---|
| 3,936,744 A * | 2/1976 | Perlmutter | ................... 324/772 |
| 4,177,389 A | 12/1979 | Schott | |
| 4,355,240 A | 10/1982 | Hamilton | |
| 4,359,679 A | 11/1982 | Regan | |
| 4,517,507 A | 5/1985 | Nordbrock et al. | |
| 4,701,690 A | 10/1987 | Frnandez et al. | |
| 5,166,538 A * | 11/1992 | Norton | ....................... 307/10.1 |
| 5,166,594 A | 11/1992 | Schramm et al. | |
| 5,426,371 A * | 6/1995 | Salley et al. | ................. 324/429 |
| 5,488,283 A * | 1/1996 | Dougherty et al. | ........ 307/10.1 |
| 5,594,321 A | 1/1997 | Kohl et al. | |
| 5,600,232 A * | 2/1997 | Eavenson et al. | ............. 322/12 |
| 5,670,861 A * | 9/1997 | Nor | ............................ 320/118 |
| 5,701,089 A * | 12/1997 | Perkins | ........................ 324/772 |
| 5,834,854 A * | 11/1998 | Williams | .................... 307/10.6 |
| 5,982,158 A | 11/1999 | Schnars et al. | |
| 6,153,855 A | 11/2000 | Renner et al. | |
| 6,191,499 B1 | 2/2001 | Severson et al. | |
| 6,239,994 B1 | 5/2001 | Abdoulin | |
| 6,275,012 B1 | 8/2001 | Jabaji | |
| 6,351,403 B2 | 2/2002 | Abdoulin | |

(Continued)

*Primary Examiner*—Julio C. Gonzalez
(74) *Attorney, Agent, or Firm*—Frijouf, Rust & Pyle P.A.

(57) ABSTRACT

An improved regulator system is disclosed for controlling a field winding of an alternator to regulate the charging of a battery. The improved regulator system comprises an internal regulator mounted onto the alternator. The internal regulator has an internal regulator control circuit for monitoring the battery and for controlling the field winding. An electrical connector actuates the internal regulator to regulate the output of the alternator in accordance with the internal regulator. The electrical connector enables an external regulator to be connected to the alternator thereby bypassing the internal regulator to regulate the output of the alternator in accordance with the external regulator. The improved regulator system facilitates the connection of an upgrade external regulator with the internal regulator functioning as a reserve regulator in the remote event of a malfunction of the external regulator.

4 Claims, 5 Drawing Sheets

U.S. PATENT DOCUMENTS

| | | |
|---|---|---|
| 6,373,230 B2 | 4/2002 | Jabaji |
| 6,469,276 B1 | 10/2002 | Renner et al. |
| 6,476,509 B1 * | 11/2002 | Chen et al. ................ 290/1 R |
| 6,534,959 B1 * | 3/2003 | Anderson et al. ............ 322/28 |
| 6,590,367 B2 | 7/2003 | Kim |
| 6,633,802 B2 | 10/2003 | Sodoski et al. |
| 7,104,847 B2 * | 9/2006 | Sodemann et al. ......... 439/638 |
| 2004/0155540 A1 * | 8/2004 | Nakamura et al. ........ 310/68 D |
| 2005/0031944 A1 * | 2/2005 | Sodemann et al. ......... 429/150 |

* cited by examiner

REGULATOR SYSTEM FOR ALTERNATOR

CROSS-REFERENCE TO RELATED APPLICATIONS

This application claims benefit of U.S. Patent Provisional application Ser. No. 60/520,603 filed Nov. 17, 2003. All subject matter set forth in provisional application Ser. No. 60/520,603 is hereby incorporated by reference into the present application as if fully set forth herein.

BACKGROUND OF THE INVENTION

1. Field of the Invention

This invention relates to the generation of electricity and more particularly to an improved regulator system for a power generator such as an alternator or the like.

2. Description of the Related Art

A battery charging circuit comprises a source of electrical current and an electrical regulator. In the case of a rotary source of electrical current, such as an electrical generator or an electrical alternator, the electrical regulator controls the voltage produced by the electrical generator or an electrical alternator. The electrical regulator increases the output of the electrical generator or an electrical alternator until the battery is charged to a preselected voltage. Thereafter, the electrical regulator decreases the output of the electrical generator or an electrical alternator to maintain the preselected voltage of the battery.

In some electrical alternators, the electrical regulator is located within the housing of the electrical alternator. In general, the electrical regulators located within the housing of the electrical alternator are single stage electrical regulators. In a single stage electrical regulator, the electrical regulator controls the charging of the battery to a single preselected battery voltage. In a multiple stage electrical regulator, the electrical regulator sequentially controls the charging of the battery to multiple preselected battery voltages depending on the voltage and/or the state of charge of the battery. Due to the cost, complexity and size of a multiple stage electrical regulator, single stage electrical regulators are typically found located within the housing of the electrical alternator of original equipment manufacturers.

Some in the prior art have attempted to utilize multiple electrical regulators in a battery charging circuit. The following U.S. patents illustrate attempts of the prior art to utilize multiple electrical regulators in a battery charging circuit.

U.S. Pat. No. 4,177,389 to Schott discloses a power supply system having two regulated power supply devices with outputs connected in parallel for redundant half-load operation. Each power supply device has a voltage regulator and a current regulator with outputs connected in parallel to a switching transistor that provides regulation. A discriminator and transfer switch in each power supply device compares sensed load currents in both the power supply devices and switches the power supply device from current regulation to voltage regulation or vice-versa. By use of the transfer switch and discriminator, an active, reaction-free load take over in the case of a failure of one of the power supply devices operating in a voltage regulation mode may be accomplished. The other power supply device is then switched from a current regulation mode to a voltage regulation mode so as to take over from the power supply device that has failed.

U.S. Pat. No. 4,355,240 to Hamilton relates to a plurality of current controlled converters coupled in parallel controlled by a central regulation circuit. Each individual converter includes an auxiliary regulation circuit which is coupled to provide backup regulation if the central regulation circuit fails. The auxiliary regulation circuit has high and low response limits that come into action depending upon whether the central regulation fails in a high or low mode. This permits the converter to remain operative and continue to regulate its output within a predefined backup limit when the central regulation circuit fails.

U.S. Pat. No. 4,359,679 to Regan discloses a system of parallel switching regulators sharing a common load, each regulator generating controllable pulses from an unregulated d-c. voltage source and then smoothing those pulses to form a d-c. output that varies according to changes in the pulses. A comparator controls the pulses according to the differential between a reference signal and a feedback signal, and an output resistor is connected between the comparator and the load. A reference signal source generates a reference signal for the comparator in a first one of the regulators, and the load side of the output resistor in the first regulator is connected to the feedback signal input to the comparator in that regulator so that the load voltage is determined by the reference signal for the first regulator. The comparator side of the output resistor in the first regulator is connected to the reference signal input to the comparator in a second one of the regulators, and the comparator side of the output resistor in the second regulator is connected to the feedback signal input to the comparator in the second regulator so that the current supplied to the load by the second regulator is equal to the current supplied by the first regulator.

U.S. Pat. No. 4,517,507 to Nordbrock, et al. relates to a single alternator having multiple isolated windings for providing multiple outputs as for charging 12 and 24 volt batteries. A main regulator controls the field coil current and a secondary regulator controls the charging current for the second battery by controlling the second rectifier.

U.S. Pat. No. 4,701,690 to Fernandez, et al. teaches a transfer apparatus for use with an AC generator having a field winding, the DC energization of which controls the output of the generator. Associated with the generator are first and second voltage regulators each including means for sensing the output of the generator and means for varying the DC energization of the generator field winding to regulate the output of the generator to a respective reference level for each voltage regulator. The transfer apparatus includes a circuit for generating a first signal as a function of the generator output as sensed by the first voltage regulator sensing means and a second signal as a function of the generator output as sensed by the second voltage regulator sensing means. Another circuit independently produces an additional signal to which the first and second signals ordinarily have a predetermined relationship. A further circuit selects the first or second voltage regulator to energize the generator field winding. The selection depends on whether or not there is a departure of the first signal from the predetermined relationship to the additional signal when the second signal maintains its predetermined relationship thereto. Other transfer apparatus and regulating apparatus and methods are also disclosed.

U.S. Pat. No. 5,166,594 to Schramm, et al. discloses a battery charging system including a generator, a rectifier system with main diodes and exciter diodes as well as two terminals for battery charging, at least one terminal for consuming points, a voltage regulator for a generator output voltage, a charging control light and a fail-safe device structured to indicate faults and for protection from excess voltages. The fail-safe device includes an additional voltage regulating device connected electrically to the generator and a relay connected with the additional voltage regulating device. The fail-safe device also can include three voltage dividers to provide different adjustable voltage thresholds, four zener diodes connected across terminals for limiting voltage, a pulse generator and a delay stage structured and connected so that the additional voltage regulating device regulates the generator output voltage, when an excess voltage occurs or a defective connection is present in the voltage regulator.

U.S. Pat. No. 5,594,321 to Kohl, et al relates to a battery charging apparatus including a generator, main voltage regulator, an auxiliary voltage regulator, at least one consuming device and a protective circuit having circuit portions for recognizing and signaling faults via a charge control lamp. The generator output voltage is rectified with rectifier bridges containing zener diodes. Voltage comparison to threshold values and logic circuitry for processing the comparison results are used to determine the presence of faults in the operation of the battery charging apparatus. The fault detection device detects conduction defects in the main voltage regulator and/or interruption in the generator excitation circuit. The logic circuitry determines whether simultaneously both a supplied voltage exceeds a threshold value and the main voltage regulator is turned on longer than a predetermined time interval to indicate its continuous operation. After a fault is detected, a voltage regulation is performed by the auxiliary voltage regulator until the fault is eliminated so that the rectifier bridges are not destroyed. The battery charging apparatus described is particularly suitable for use in motor vehicles.

U.S. Pat. No. 5,600,232 to Eavenson, Sr, et al. discloses a charging system including a high capacity charging circuit having the original internal engine alternator connected substantially in parallel with an auxiliary alternator by a simple wiring harness arrangement that easily plugs into the existing connectors for the internal engine alternator circuit so that the outputs of the alternators are cumulative. The auxiliary alternator is relatively compact, and the original engine alternator circuit remains substantially unaltered. The regulators for the two alternators include sensory inputs which are connected to each other. The alternators provide redundancy and a fail-safe backup mode so that if one of the systems fails, that system can be quickly disconnected from the remaining system without disabling the entire vehicle.

U.S. Pat. No. 5,982,158 to Schnars, et al. relates to a voltage regulator circuit having a series device external to an integrated circuit voltage regulator. The external series device provides a voltage drop prior to the voltage being input to the voltage regulator during high power applications. Depending on the power level, low or high, one of two transistors will be activated. For low power applications, a transistor attached directly to the input voltage is active and the external series device is bypassed. For high power applications, the external series device provides a voltage drop prior to the input voltage reaching the second transistor thereby lowering the power to be dissipated by the integrated circuit.

U.S. Pat. No. 6,153,855 to Renner, et al. teaches a method and apparatus for providing a welding output and an auxiliary output from a generator having a field winding, an auxiliary output winding and a welding output winding. One or both of a welding output and an auxiliary output are detected, and feedback signals indicative of the presence or absence of one or both of a welding output and an auxiliary output are provided. A controller, preferably an electromc field controller includes an auxiliary output regulator enabled or disabled by the output detector feedback signal and a welding regulator enabled or disabled by the output detector feedback, such that one and only one of the auxiliary output regulator and welding regulator is enabled. The auxiliary output regulator is connected to an auxiliary output feedback circuit, thereby providing closed loop control, preferably with a CV output. A maximum auxiliary power output is available in the absence of the welding output, and less then the maximum auxiliary power output is available in the presence of the welding output.

U.S. Pat. No. 6,191,499 to Severson, et al. discloses a voltage regulation system, method of operation and multiple processor apparatus employing the system or method. The voltage regulation system includes a plurality of voltage regulation modules (VRMs) coupled to a plurality of processors, each one of the VRMs is dedicated to only one of the plurality of processors wherein a processor is powered down in response to a failure of its respective dedicated VRM.

U.S. Pat. No. 6,239,994 to Abdoulin relates to a switching power converter for producing regulated D.C. power at two or more voltages. First and second regulation circuits including switching elements are connected across the secondary side of a transformer. A control circuit including a phase lock loop provides a first timing signal in leading relation to the AC input, and a delay circuit that provides a second timing circuit in delayed relation to the first timing signal. A logic circuit is responsive to the first and second timing signals to provide drive signals for the switching elements. The regulation circuits each include a first switching element having a power terminal coupled to the secondary winding and another power terminal is coupled to an intermediate node. A second switching element has a power terminal coupled to the intermediate node and another power terminal coupled to a common node. An inductor is coupled from the intermediate node to an output node. The control circuit delivers drive signals to control terminals of the switching elements to switch the switching elements on and off such that first and second regulated voltages appear between the first and second output nodes and the common node, respectively.

U.S. Pat. No. 6,275,012 to Jabaji teaches an alternator generating output power at two or more independent voltages. The alternator has two independent output windings configured to generate the power needed for each output. Each output voltage is sensed by a regulator that controls switching rectifiers to supply the current needed to satisfy the electric power demand of the loads connected to each output. After both output load demands are satisfied, the regulator switches off the alternator field. When power demand from either load rises, the alternator field is switched on along with the respective switching rectifier to satisfy the power demand. The output voltage grounds and control signals may be electrically isolated from each other.

U.S. Pat. No. 6,351,403 to Abdoulin discloses a switching power converter for producing regulated D.C. power at two or more voltages. First and second regulation circuits including switching elements are connected across the secondary side of a transformer. A control circuit including a phase lock loop provides a first timing signal in leading relation to the AC input, and a delay circuit which provides a second timing circuit in delayed relation to the first timing signal. A logic circuit is responsive to the first and second timing signals to provide drive signals for the switching elements. The regulation circuits each include a first switching element having a power terminal coupled to the secondary winding and another power terminal is coupled to an intermediate node. A second switching element has a power terminal coupled to the intermediate node and another power terminal coupled to a common node. An inductor is coupled from the intermediate node to an output node. The control circuit delivers drive signals to control terminals of the switching elements to switch the switching elements on and off such that first and second regulated voltages appear between the first and second output nodes and the common node, respectively.

U.S. Pat. No. 6,373,230 to Jabaji relates to an alternator generating output power at two or more independent voltages. The alternator has two independent output windings configured to generate the power needed for each output. Each output voltage is sensed by a regulator that controls switching rectifiers to supply the current needed to satisfy the electric power demand of the loads connected to each output. After both output load demands are satisfied, the regulator switches off the alternator field. When power demand from either load rises, the alternator field is switched on along with the respective switching rectifier to satisfy the power demand. The output voltage grounds and control signals may be electrically isolated from each other.

U.S. Pat. No. 6,469,276 to Renner, et al. discloses a method and apparatus for providing a welding output and an auxiliary output from a generator having a field winding, an auxiliary output winding and a welding output winding. One or both of a welding output and an auxiliary output are detected, and feedback signals indicative of the presence or absence of one or both of a welding output and an auxiliary output are provided. A controller, preferably an electronic field controller includes an auxiliary output regulator enabled or disabled by the output detector feedback signal and a welding regulator enabled or disabled by the output detector feedback, such that one and only one of the auxiliary output regulator and welding regulator is enabled. The auxiliary output regulator is connected to an auxiliary output feedback circuit, thereby providing closed loop control, preferably with a CV output. A maximum auxiliary power output is available in the absence of the welding output, and less then the maximum auxiliary power output is available in the presence of the welding output.

U.S. Pat. No. 6,590,367 to Kim relates to an external type regulator for a vehicle alternator, and in particular to an external type regulator for a vehicle alternator which is capable of preventing a damage of electric parts and a battery by stopping a power, generation by disconnecting a field current flowing in a field coil through a relay in the case that an over charge occurs in an alternator due to a damage of a regulator. The regulator for a vehicle alternator includes an over charge disconnector which includes a dividing resistor for dividing a voltage inputted through an IG terminal, a zener diode which is turned off in the case that the voltage divided by the dividing resistor is higher than a zener voltage, for thereby detecting an over charge of an alternator which occurs in an IG terminal, first and second transistors which are turned on when the zener diode detects an over charge and is turned on and output a relay driving signal, a relay which has a contact point terminal connected between a power transistor and a field coil of the voltage adjusting unit and switch-driven in response to a relay driving signal when the first transistor is turned on, for thereby disconnecting a field current flowing between the power transistor and the field coil, and a plurality of resistors, condensers and diodes, whereby the over charge disconnector stops a power generation of the alternator by detecting an over charge of the alternator and disconnecting a field current flowing in the field coil.

U.S. Pat. No. 6,633,802 to Sodoski, et al. teaches a vehicle power system including a multiple of electrical generators which provide power for vehicle electrical systems or loads through an electrical load management center which communicates with a general purpose processor set such that the power supplied to each electrical load may be individually controlled. A display communicates with the GPPS to present an electrical system status screen to the vehicle crew such that the crew is constantly made aware of the prevailing electrical power conditions in a rapid and efficient manner. During a drastically reduced generator situation, the GPPS automatically disconnects loads via a predefined load shed priority list. Once electrical loads are disconnected via the predefined load shed priority list the crew can reactivate and deactivate selected systems for the current mission circumstances through a load recovery screen accessible through the display.

Most original equipment manufacturers of engines incorporate a single stage electrical regulator located within the housing of the electrical alternator for charging a single battery. Many uses of these original equipment engines such as marine vessels, truck, recreational vehicles, standby power sources and the like require a multiple stage electrical regulator for charging multiple batteries. Unfortunately, the disconnection of the single stage electrical regulator located within the housing of the electrical alternator and the connection of the multiple stage electrical regulator located outside of the housing of the electrical alternator is not a simple process.

Therefore, it is an object of the present invention to provide an improved regulator system for an alternator that overcomes the problems of the prior art and provides a significant advancement to the prior art.

Another object of this invention is to provide an improved regulator system for an alternator incorporating an internal regulator located within an alternator housing adapted to be readily disconnected for enabling an external regulator located outside of the alternator housing to be readily connected to the alternator.

Another object of this invention is to provide an improved regulator system for an alternator incorporating a multiple stage external electrical regulator located outside of the alternator housing and a single stage internal regulator located within an alternator housing.

Another object of this invention is to provide an improved regulator system for an alternator incorporating an internal regulator located within the alternator housing adapted to be readily disconnected from the alternator for providing a reserve regulator in the remote event of a malfunction of an external regulator located outside of the alternator housing.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to an improved regulator system for controlling a field winding of an alternator to regulate the charging of a battery comprising an internal regulator mounted onto the alternator. The internal regulator has an internal regulator control circuit for monitoring the battery and for controlling the field winding. An electrical connector actuates the internal regulator to regulate the output of the alternator in accordance with the internal regulator. The electrical connector enables an external regulator to be connected to the alternator and to deactuate the internal regulator and for actuating the external regulator to regulate the output of the alternator in accordance with the external regulator.

In a more specific embodiment of the invention, the invention relates to an improved regulator system for controlling a field winding of an alternator to regulate the charging of a battery comprising an internal regulator mounted onto the alternator. The internal regulator has an internal regulator sensing circuit for monitoring the battery. An internal regulator driver circuit controls the flow of current through the field winding of the alternator for charging of the battery. An external regulator is mounted external to the alternator. The external regulator has an external regulator sensing circuit for monitoring the battery. An external regulator driver circuit for controls the flow of current through the field winding of the alternator for charging of the battery. An actuator connector actuating one of the internal regulator and the external regulator to control the internal and the external field winding control device, respectively, to regulate the output of the alternator in accordance with the one of the internal and external regulators.

In another example, the internal regulator is a single stage regulator and the external regulator is a multi-stage regulator. Preferably, the internal regulator is a reserve regulator and the external actuator is a primary regulator.

In a more specific embodiment of the invention, the internal regulator comprises an insulating mounting body. The insulating mounting body has a plurality of metallic mounting tabs for physically mounting and for making electrical connection to the alternator. The insulating mounting body has an aperture for receiving a circuit board containing an internal regulator circuit. Each of the plurality of metallic mounting tabs extends into the aperture for connecting to the circuit board. A polymeric material mounts and seals the circuit board within the aperture.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
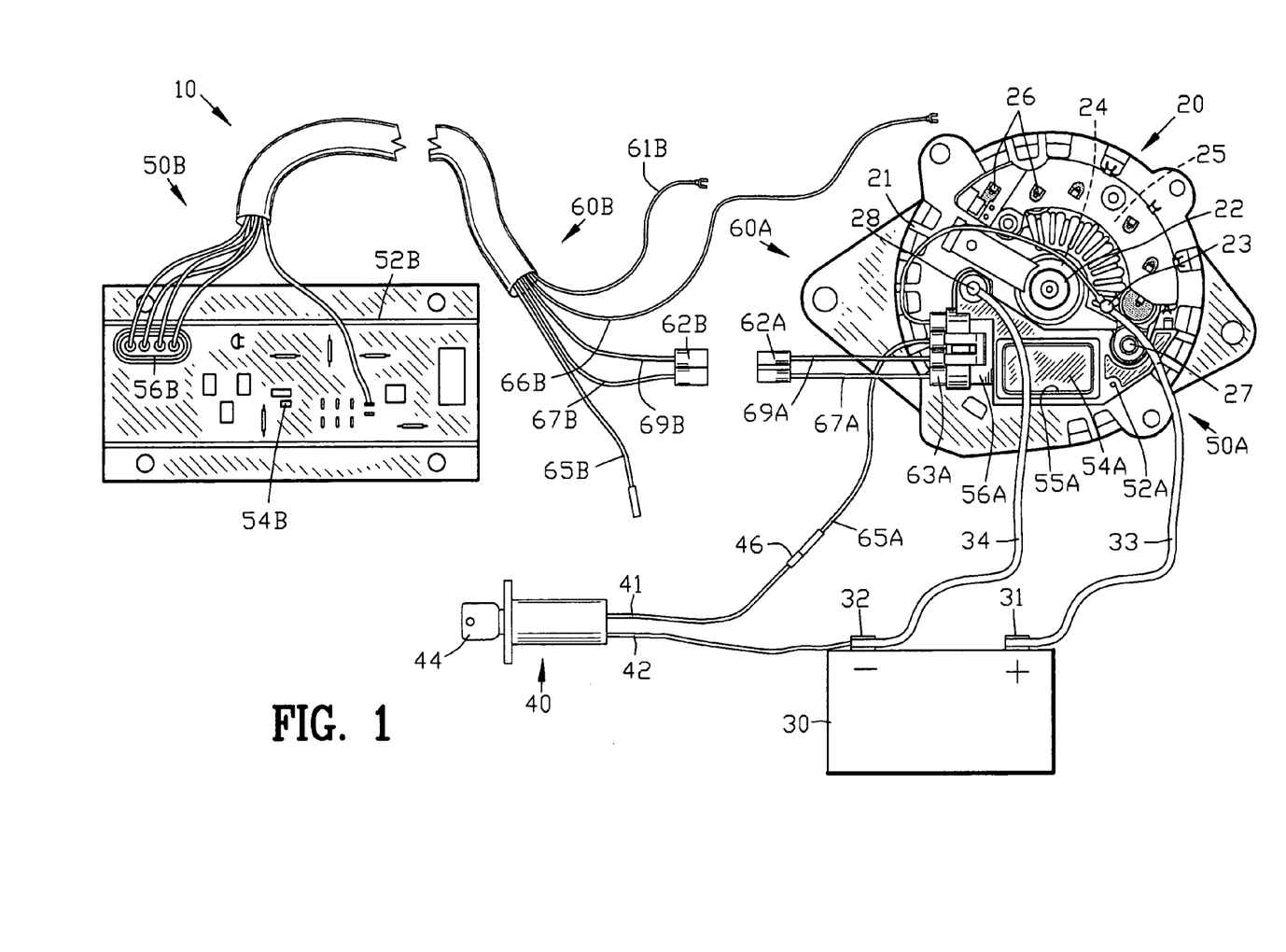
FIG. 1 is a diagram of the improved regulator system of the present invention comprising an internal electrical regulator mounted internal to an alternator housing and an external electrical regulator located external to the alternator housing and with the external electrical regulator being disconnected from the alternator and with the alternator operating with the internal regulator.

FIG. 1 is a diagram of the improved regulator system 10 of the present invention for controlling an electrical alternator 20 for charging a battery 30. The electrical alternator 20 comprises a housing 21 containing a rotor 22 rotatably mounted within the housing 21. The rotor 22 includes a field winding 23 wound about a permanent magnet 24. The rotor 22 is rotated within the housing 21 by an engine through a pulley arrangement (not shown) as should be well known to those skilled in the art.

A direct current (DC) is introduced into the field winding 23 by a set of brushes (not shown). The direct current (DC) introduced into the field winding 23 is commonly known as a field current. The amount of field current introduced into the field winding 23 controls the strength of the magnetic field generated by the rotor 22.

A stator winding 25 is located within the housing 21 and surrounding the rotor 22. Typically, the stator winding 25 comprises three stator windings for generating a three phase alternating current (AC) output. As the field winding 23 of the rotor 22 rotates within the stator windings 25, the magnetic field generated by the rotor 22 sweeps through the stator windings 25 to generate the three-phase alternating current (AC) output. A plurality of diodes 26 rectify the three phase alternating current (AC) output from the stator windings 25 to produce a pulsating DC current between a positive terminal 27 and a negative terminal 28 of the alternator 20.

The battery 30 has a positive terminal 31 and a negative terminal 32. Plural connector wires 33 and 34 connect the positive and negative terminals 27 and 28 of the alternator 20 to the positive and negative terminals 31 and 32 of the battery 30. The pulsating DC current produced by the alternator 20 is applied to the positive and negative terminals 31 and 32 of the battery 30.

An ignition switch 40 provides a connection between conductors 41 and 42 upon the rotation of a key 44. The conductor 41 terminates in a connector 46 whereas the conductor 42 is connected to the negative terminal 32 of the battery 30.

An internal electrical regulator 50A is mounted to the alternator 20 to be contained within housing 21 of the alternator 20. The internal electrical regulator 50A comprises a regulator body 52A mounted to the positive and negative terminals 27 and 28 of the alternator 20. Preferably, the regulator body 52A is formed from an insulating polymeric material for supporting an electrical regulator circuit 54A. In the preferred embodiment of the present invention, the electrical regulator circuit 54A takes the form of a miniature circuit board supported in and seals within an aperture 55A of the regulator body 52A. The internal electrical regulator 50A may be representative of a single stage electrical regulator.

The internal electrical regulator 50A has a socket 56A for connection to a wiring harness 60A through a removable plug 62A. The removable plug 62A supports an ignition wire 65A connected through the connector 46 and conductor 41 to the key switch 40. The removable plug 62A further supports and wires 67A–69A for external connection. The wires 67A–69A provide electrical power for operation of other electrical devices and appliances depending upon the specific installation of the alternator 20.

An external electrical regulator 50B is shown located external to the housing 21 of the alternator 20. The external electrical regulator 50B is shown disconnected from the alternator 20. The external electrical regulator 50B comprises a regulator body 52B for supporting an electrical regulator circuit 54B. The electrical regulator circuit 54B takes the form of a circuit board supported in and seals within the regulator body 52A. The external electrical regulator 50B may be representative of a multiple stage electrical regulator.

The external electrical regulator 50B has a socket 56B for connection to a wiring harness 60B having a removable plug 62B. The wiring harness 60B includes a ground wire 61B, an ignition wire 65B for connection to the connector 46 and conductor 41 to the key switch 40. The wiring harness 60B further includes a field wire 66B for connection to the field winding 23 of the alternator 20. The removable plug 62B supports and wires 67B–69B for external connection. The wires 67B–69B provide electrical power for operation of other electrical devices and appliances depending upon the specific installation of the alternator 20.

FIG. 1 illustrates the internal electrical regulator 50 connected to the alternator 20 for providing voltage regulation for the alternator 20. The external electrical regulator 50B is shown in being disconnected from the alternator 20.

The internal electrical regulator 50A senses the voltage of the system relative to a predetermined value for controlling the field current through the field winding 23 to vary the output of the alternator 20. When the internal electrical regulator 50A senses a lower voltage relative to the predetermined value, the internal electrical regulator increases the field current through the field winding 23 to increase the output of the alternator 20. Conversely, when the internal electrical regulator 50A senses a higher voltage relative to the predetermined value, the internal electrical regulator 50A decreases the field current through the field winding 23 to reduce the output of the alternator 20.

Figure 2:
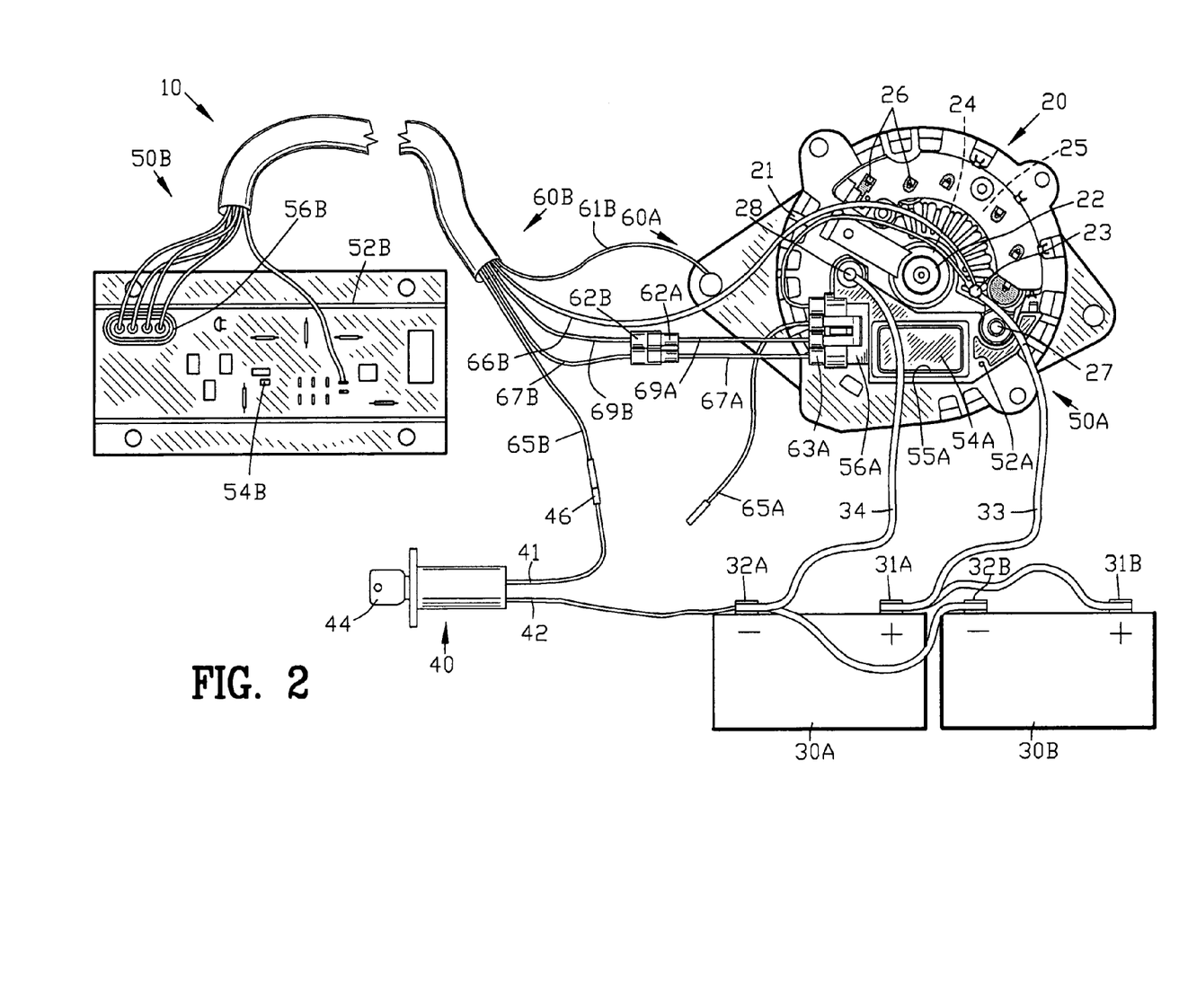
FIG. 2 is a diagram of the improved regulator system of FIG. 1 and with the internal electrical regulator being disconnected from the alternator and with the external electrical regulator being connected to the alternator and with the alternator operating with the external regulator.

FIG. 2 is a diagram of the improved regulator system 10 of FIG. 1 and with the internal electrical regulator 50A being disconnected from the alternator 20 and with the external electrical regulator 50B being connected to the alternator 20. The internal electrical regulator 50A is disconnected from the alternator 20 by removing the ignition wire 65A from the connector 46.

The external electrical regulator 50B is connected to the alternator 20 by inserting the plug 62B into the socket 62A and by further inserting the ignition wire 65B into the connector 46. In addition, the field wire 66B is connected to the field winding 23 of the alternator 20. The ground wire 61B is connected to the alternator as shown.

Upon connection of the external electrical regulator 50B, the external electrical regulator 50B senses the voltage of the system relative to a predetermined value for controlling the field current through the field winding 23 to vary the output of the alternator 20. Preferably, the external electrical regulator 50B is a multiple stage electrical regulator for charging of the battery 30 in accordance with multiple predetermined values of voltage. The ability to charge a battery 30 in accordance with multiple predetermined values enables the multiple stage electrical regulator to accommodate for batteries of various electrical characteristics and properties.

Figure 3:
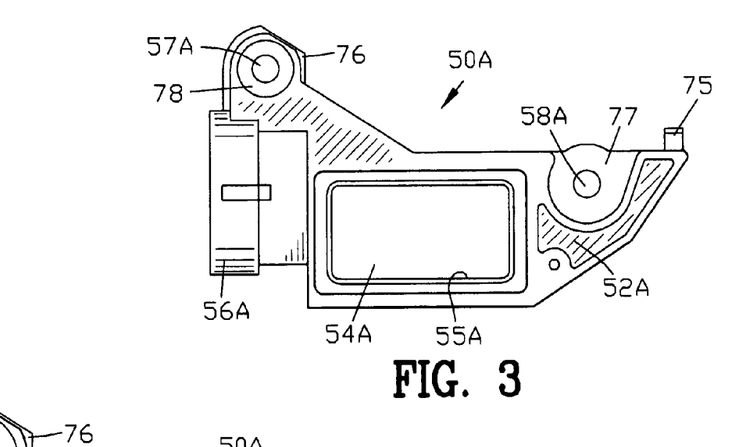
FIG. 3 is a is an enlarged view of the internal electrical regulator of FIGS. 1 and 2.
Figure 5:
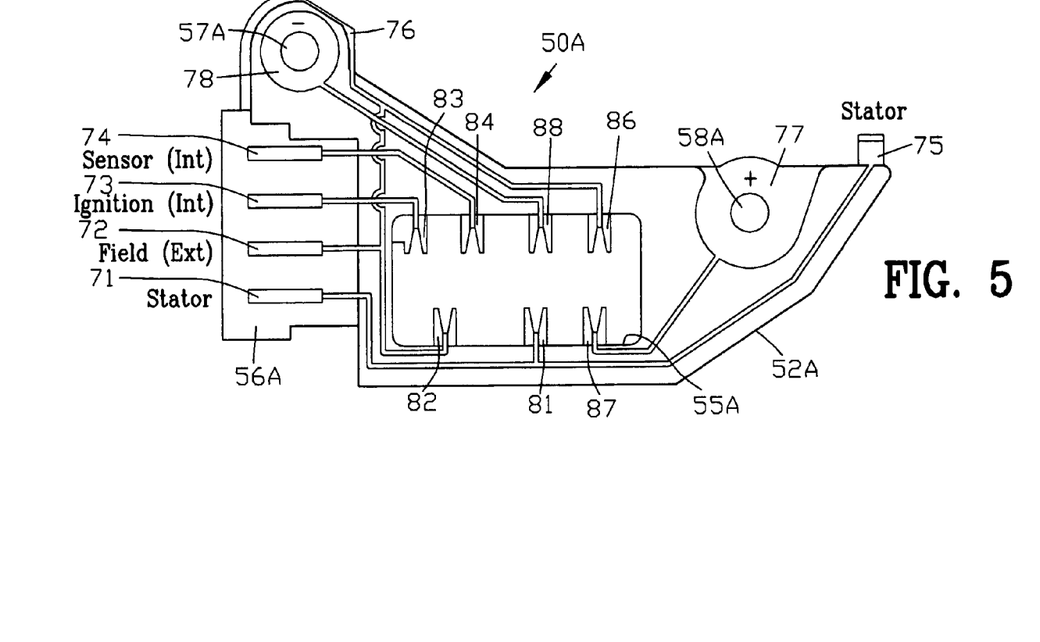
FIG. 5 is a magnified sectional view along line 5—5 in FIG. 4.

FIGS. 3 and 5 are enlarged views of the internal electrical regulator 50A of FIGS. 1 and 2. The internal electrical regulator 50A includes plural mounting holes 57A and 58A for mounting the internal electrical regulator 50A to the positive and negative terminals 27 and 28 of the alternator 20.

The regulator body 52A is formed from an insulating polymeric material for supporting the electrical regulator circuit 54A. The electrical regulator circuit 54A is shown as a miniature circuit board supported within the aperture 55A of the regulator body 52A. Preferably, the electrical regulator circuit 54A is encased by an insulating curable polymeric material for sealing the electrical regulator circuit 54A for operation in various environments.

Figure 4:
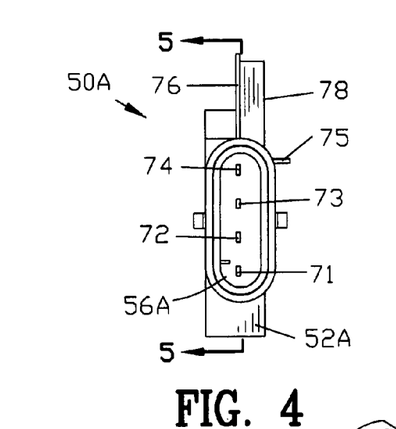
FIG. 4 is a left side view of FIG. 3.

FIG. 5 is a magnified sectional view along line 5—5 in FIG. 4 with the electrical regulator circuit 54A being removed from the regulator body 52A. The regulator body 52A supports and insulates plug pins 71–74 within the socket 56A. The regulator body 52A further supports and insulates terminals 75–78. In addition, the regulator body 52A supports lugs 81–84 and 86–88 extending into the aperture 55A of the regulator body 52A. A plurality of electrical conductors interconnect the plug pins 71–74 and the terminals 75–78 with the lugs 81–84 and 86–88 as shown in FIG. 5. The lugs 81–84 and 86–88 extend into the aperture 55A of the regulator body 52A to make contact with the electrical regulator circuit 54A. Preferably, the regulator body 52A is molded about the plug pins 71–74 and the terminals 75–78 and the lugs 81–84 and 86–88.

Figure 6:
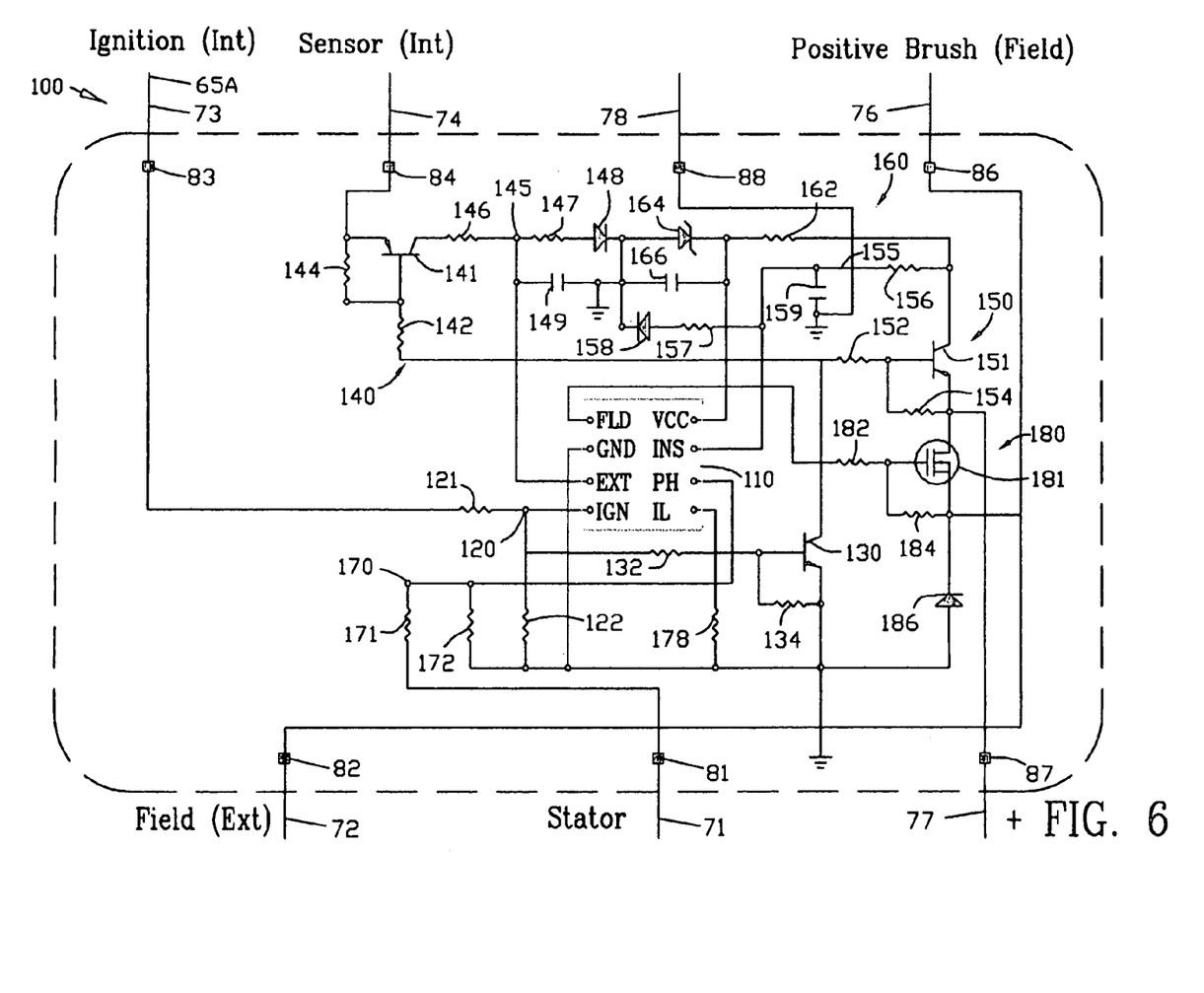
FIG. 6 is a circuit diagram of the internal electrical regulator circuit of FIGS. 1–5.

FIG. 6 is a circuit diagram of the internal electrical regulator circuit 54A of FIGS. 1–5. The internal electrical regulator circuit 54A is connected through the lugs 81–84 and 86–88 shown extending into the aperture 55A of the regulator body 52A in FIG. 5. Preferably, the internal electrical regulator circuit 54A in located on a circuit board that is soldered to the lugs 81–84 and 86–88 for making electrical contact with and for supporting the circuit board containing the internal electrical regulator circuit 54A.

The internal electrical regulator circuit 54A comprises an integrated circuit 110 for controlling the charging parameters of the internal electrical regulator 50A. The integrated circuit 110 receives various inputs to provide an output to control the field current through the field winding 23 in accordance with preselected values and/or parameters. Preferably, the preselected values and/or parameters are stored within the integrated circuit 110 or may be determined by external components and/or inputs to the integrated circuit 110.

The ignition circuit 65A is connected through lug 83 to a voltage divider 120 comprising resistors 121 and 122. The resistor 121 functions to limit the voltage applied to the IGN terminal of the integrated circuit 110. The resistor is 122 is connected to ground to hold the IGN terminal of the integrated circuit 110 in a low condition in the event of a loss of voltage or an open circuit.

The output of the voltage divider 120 is connected through an input resistor 132 to a switch 130 shown as a transistor 130. The input resistor 132 functions to limit the current applied to the base of the transistor 130. A pull down resistor 134 is connected between the base and the emitter of the transistor 130 to insure the transistor 130 is turned off in the event of a loss of voltage or an open circuit. In addition the pull down resistor 134 insurers that any leakage current due to high-temperature operations is shunted from the transistor 130 to prevent undesired conduction of transistor 130.

The collector of transistor 130 is connected to an external sensing circuit 140 and an internal sensing circuit 150. As will be described in greater detail hereinafter, the integrated circuit 110 is provided with logic for determining which of the external sensing circuit 140 and the internal sensing circuit 150 will be used for operating the integrated circuit 110. In addition, the collector of transistor 130 is connected to regulator circuit 160.

The external sensing circuit 140 comprises transistor 141 having an input resistor 142 and a pull down resistor 144. The input resistor 142 limits the current applied to the base of the transistor 141 whereas the pull down resistor 144 insure the transistor 141 is turned off in the event of a loss of voltage, an open circuit and/or a high leakage current. The transistor 141 operates as a saturated switch to provide voltage to a voltage divider 145.

The voltage divider 145 comprises resistor 146 and 147 in series with a diode 148. A filter capacitor 149 is connected between the midpoint of the voltage divider 145 and ground. The capacitor 149 eliminates any noise or undesired signals at the voltage divider 145. The output of the voltage divider 145 is a scaled external battery voltage applied to the EXT terminal of the integrated circuit 110.

The internal sensing circuit 150 operates in a manner similar to the external sensing circuit 140. The internal sensing circuit 150 comprises transistor 151 having an input resistor 152 and a pull down resistor 154. The input resistor 152 limits the current applied to the base of the transistor 151 whereas the pull down resistor 154 insure the transistor 151 is turned off in the event of a loss of voltage, an open circuit and/or a high leakage current. The transistor 151 operates as a saturated switch to provide voltage to a voltage divider 155.

The voltage divider 155 comprises resistor 156 and 157 in series with a diode 158. A filter capacitor 159 is connected between the midpoint of the voltage divider 155 and ground. The capacitor 159 eliminates any noise or undesired signals at the voltage divider 155. The output of the voltage divider 155 is scaled internal battery voltage applied to the INS terminal of the integrated circuit 110.

The regulator circuit 160 comprises resistor 162 and zener diode 164. A capacitor 166 is connected to eliminate any noise or undesired signals from the regulator circuit 160. The regulator circuit 160 is connected to the VCC terminal of the integrated circuit 110 to provide operating power thereto.

The stator winding circuit 71 is connected through lug 81 to a voltage divider 170 comprising resistors 171 and 172. The resistor 171 functions to limit the voltage applied to the PH terminal of the integrated circuit 110. The resistor is 172 is connected to ground to hold the PH terminal of the integrated circuit 110 in a low condition in the event of a loss of voltage or an open circuit. The output of the voltage divider 170 enables the integrated circuit 110 to detect zero crossing of the stator winding 25. The IL terminal of the integrated circuit 110 maybe used for driving a lamp circuit or the like.

The integrated circuit 110 generates a pulse width modulated (PWM) square waveform from the FLD terminal. As will be described in greater detail with reference to FIG. 7, the width of the pulses is determined by the logic within the integrated circuit 110. If more electrical output is required from the electrical alternator 20, the integrated circuit 110 generates a series of pulses to drive a field winding driver circuit 180.

The field winding driver circuit 180 comprises a switch shown as a field effect transistor 181. The FLD terminal of the integrated circuit 110 is connected through an input resistor 182 to the field effect transistor 181. A pull down resistor 184 is connected between the gate and the drain of the field effect transistor 181. In this example, the field effect transistor 181 is shown as an N channel FET requiring a boost circuit within the integrated circuit 110. The boost circuit is shown in grade greater detail with reference to FIG. 7.

The field effect transistor 181 is connected through lug 86 to the field winding 23 of the alternator 20. A catch diode 186 is connected between the field effect transistor 181 and ground. As will be described in greater detail hereinafter, the catch diode 186 protects the field effect transistor 181 from excessive voltage spikes emanating from collapsing magnetic fields of the field winding 23.

When ignition switch 40 is turned off, the source of field effect transistor 181 is at ground potential. A pulse from the FLD terminal of the integrated circuit 110 makes the gate of field effect transistor 181 positive to conduct a current through the field winding 23 of the electrical alternator 20. The current through the field winding 23 creates a magnetic field about the field winding 23.

When the pulse from the FLD terminal of the integrated circuit 110 terminates, the gate of field effect transistor 181 of goes low and the field effect transistor 181 ceases conduction of current through the field winding 23. The collapsing magnetic field in the field winding 23 induces a negative voltage on the source of the field effect transistor 181. The negative voltage on the source of the field effect transistor 181 causes the catch diode 186 to conduct thus limiting the negative voltage applied to the field effect transistor 181. The catch diode 186 protects the field effect transistor 181 from the negative voltage and keeps the current circulating in the field winding 23.

Figure 7:
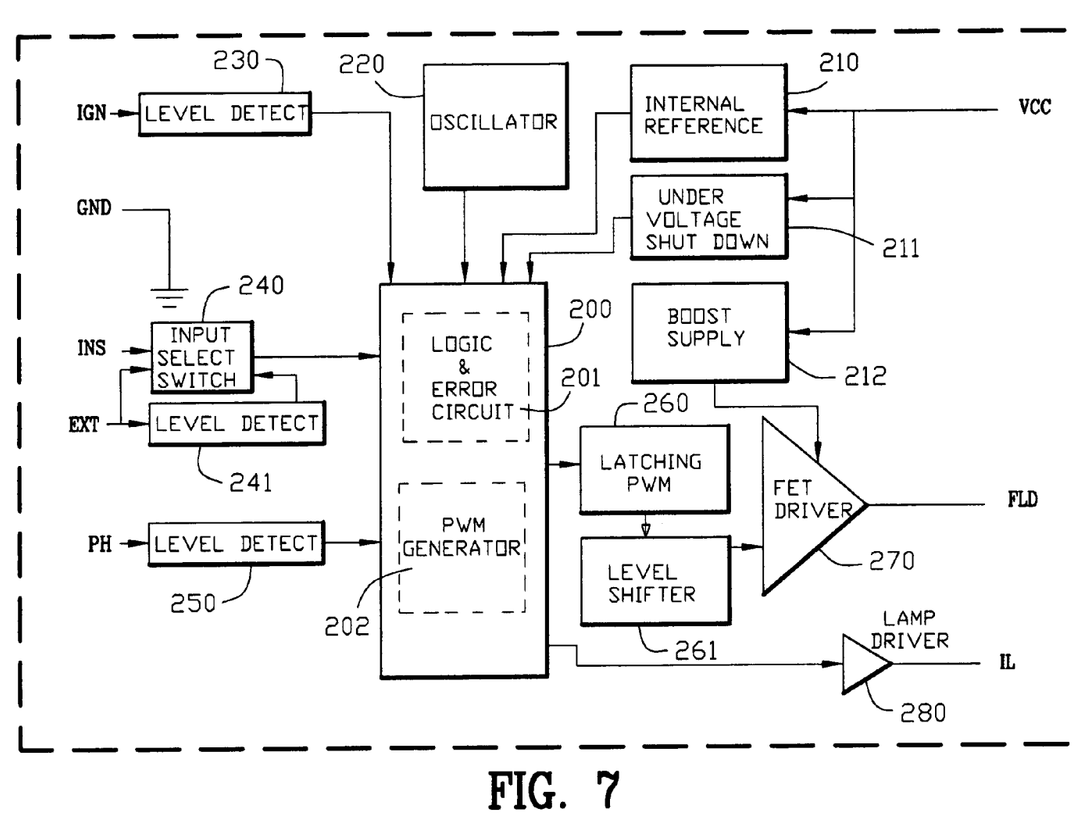
FIG. 7 is a circuit diagram of a portion of the internal electrical regulator circuit of FIG. 6.

FIG. 7 is a circuit diagram of the integrated circuit 110 of FIG 6. The integrated circuit 110 contains a logic circuit 200 comprising a logic and error circuit 201 and a pulse width modulation generator 202. The VCC terminal of the integrated circuit 110 receives operating voltage from the regulator circuit 160. The operating voltage is applied to an internal reference circuit 210, an under voltage shutdown circuit 211 and a boost supply circuit 212. The internal reference circuit 210 provides a reference voltage level for the logic circuit 200. The internal reference circuit 210 also provides a voltage level for a comparison value for use throughout the integrated circuit 110. The under voltage shutdown circuit 211 terminates operation of the integrated circuit 110 in the event that an insufficient voltage is applied to the VCC terminal.

The VCC input is applied to the boost supply circuit 212. The boost supply circuit 212 provides an output voltage greater than the battery voltage in order to a drive the field effect transistor 181 as previously described. Preferably, the boost supply circuit 212 provides a boost in voltage between 5 and 15 volts above the battery voltage.

An oscillator 220 is connected to the logic circuit 200 for providing timing pulses to the pulse width modulation generator 202 within the logic circuit 200. A level detect circuit 230 is connected to the logic circuit 200 to insure that a voltage is applied to the ignition switch 40 for a sufficient period of time to provide a valid start to the improved regulator system 10.

An input selective switch 240 compares the input on the EXT terminal of the integrated circuit 110 and the input on the INS terminal of the integrated circuit 110. The input on the EXT terminal is received from the external sensing circuit 140 whereas the input on the INS terminal is received from the internal sensing circuit 150. The input selective switch 240 determines whether a signal on the EXT terminal or a signal on the INS terminal will be used to operate the logic circuit 200. If a signal is present on the EXT terminal from the external sensing circuit 140, the input s elective switch 240 will select the signal on the EXT terminal to operate the logic circuit 200. If a signal is not present on the EXT terminal from the external sensing circuit 140, the input selective switch 240 will select the signal on the INS terminal to operate the logic circuit 200.

A level detect circuit 250 is connected to the logic circuit 200 to insure that a proper voltage level is applied to the PH for a sufficient period of time to provide a valid signal voltage to the logic circuit 200. The PH input provides information from the stator winding 25. The level detection circuit 250 may be configured as a Schmidt trigger or the like.

During the operation of the logic circuit 200, pulses from the pulse width modulation generator 202 signals are applied to a latching PWM circuit 260. The latching PWM circuit 260 insures that only pulses of a sufficient length are applied to a lever shifter circuit 261. The latching PWM circuit 260 eliminates any minute pulses that may be generated by the pulse width modulation generator 202. Preferably, the latching PWM circuit 260 is limited to one pulse per cycle of the oscillator 220.

The level shifting circuit 261 expands the output range of the latching PWM circuit 260 for proper driving the field effect driver 270. The boost supply 212 is also applied to the field effect driver 270 in order to provided signal to the field effect transistor 181 of above the battery voltage. The lamp driver 280 is provided for the IL output in the event that a lamp feature id desired.

The internal electrical regulator 50A provides for the regulation of alternator 20 in a single stage operation. In the event a multiple stage regulation is desired, the internal electrical regulator 50A maybe disconnected and the external electrical regulator 50B is connected to the internal electrical regulator 50A and the alternator 20. Upon connection on the plug 62B, the ignition wire 65B and the field wire 66B, the external electrical regulator 50B provides for a multiple stage regulation of the alternator 20.

In the event of malfunction, the external electrical regulator 50B maybe disconnected and the internal electrical regulator 50A reconnected to provide the necessary regulation for the alternator 20.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved regulator system for controlling an alternator having a field winding for charging a battery, comprising:

an internal regulator mounted onto the alternator;

said internal regulator having an internal regulator control circuit for monitoring the battery and for controlling the field winding;

an electrical connector for actuating said internal regulator to regulate the output of the alternator in accordance with said internal regulator;

said electrical connector enabling said internal regulator to be deactuated and for enabling an external regulator to be connected to the alternator to regulate the output of the alternator in accordance with the external regulator;

said electrical connector actuating one of said internal regulator and said external regulator for operating only one of said internal and external regulators at any given time; and said internal regulator being a non-operating reserve regulator during the operation of said external regulator.

2. An improved regulator system for controlling an alternator having a field winding for charging a battery, comprising:

an internal regulator mounted onto the alternator;

said internal regulator having an internal regulator control circuit for monitoring the battery and for controlling the field winding;

an electrical connector for actuating said internal regulator to regulate the output of the alternator in accordance with said internal regulator;

said electrical connector enabling said internal regulator to be deactuated and for enabling an external regulator to be connected to the alternator to regulate the output of the alternator in accordance with the external regulator;

said internal regulator being a single stage regulator; and said external regulator being a multi-stage regulator.

3. An improved regulator system for controlling an alternator having a field winding for charging a battery, comprising:

an internal regulator mounted onto the alternator;

said internal regulator having an internal regulator control circuit for monitoring the battery and for controlling the field winding;

an electrical connector for actuating said internal regulator to regulate the output of the alternator in accordance with said internal regulator;

said electrical connector enabling said internal regulator to be deactuated and for enabling an external regulator to be connected to the alternator to regulate the output of the alternator in accordance with the external regulator; and said electrical connector comprising an electrical coupling for connecting one of said internal regulator and said external regulator to actuate one of said internal and external regulators to regulate the output of the alternator.

4. An improved regulator system for an alternator as set forth in claim 3, wherein said internal regulator is adapted for charging a single battery; and said external regulator being adapted for charging a plurality of batteries.

* * * * *